G. K. PAPPAZOGLIDIS AND G. PERINES.
SAUSAGE LINKING MACHINE.
APPLICATION FILED FEB. 12, 1920.

Patented Dec. 7, 1920.

Inventors:
George K. Pappazoglidis
George Perines.

UNITED STATES PATENT OFFICE.

GEORGE K. PAPPAZOGLIDIS AND GEORGE PERINES, OF CHICAGO, ILLINOIS.

SAUSAGE-LINKING MACHINE.

1,361,094.            Specification of Letters Patent.      Patented Dec. 7, 1920.

Application filed February 12, 1920. Serial No. 358,166.

*To all whom it may concern:*

Be it known that we, GEORGE K. PAPPAZOGLIDIS, a citizen of the United States, and GEORGE PERINES, a subject of the King of Greece, and residents of the city of Chicago, county of Cook and State of Illinois, have invented certain new and useful Improvements in Sausage-Linking Machines, of which the following is a specification.

This invention relates to improvements in sausage linking machines and one of the objects of the same is to provide an improved machine of this character adapted to shape the filled casing into links and twist the links with respect to each other so that they will retain their shape and will be separated from each other but joined together by the twisted portions of the casing.

A further object is to provide an improved machine of this character which will be simple, durable and cheap in construction, and effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which:

Figure 1:
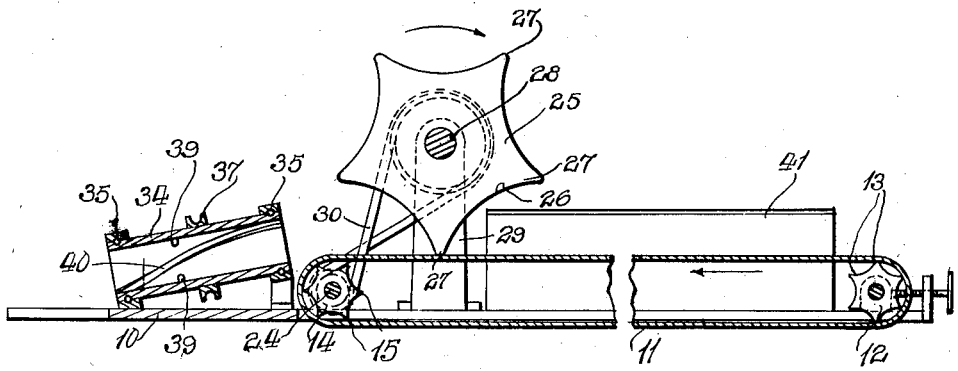
Figure 1 is a vertical longitudinal sectional view of a machine embodying this invention.
Figure 2:
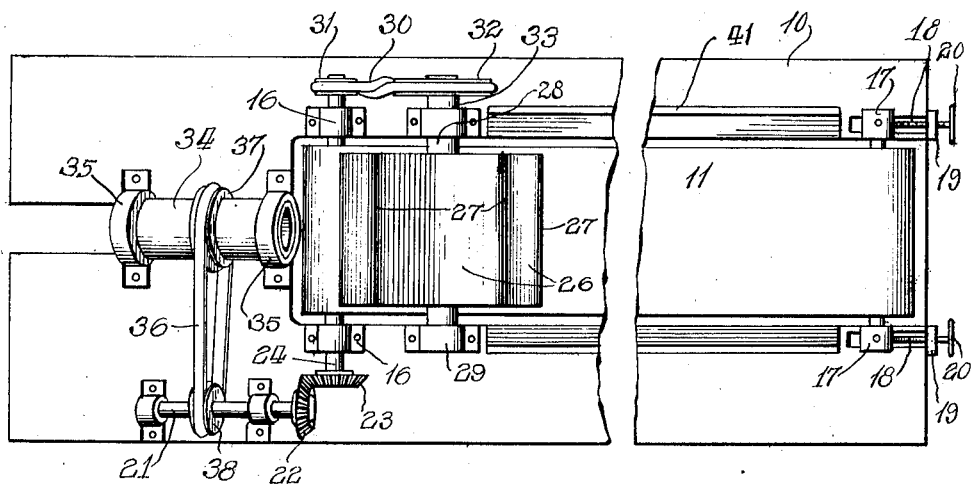
Fig. 2 is a top plan view.

Referring more particularly to the drawing the numeral 10 designates a suitable support of any desired size and material. Mounted upon the support is an endless flexible conveyer 11 constructed of any suitable material and of any desired length. This conveyer 11 passes over a suitable pulley or roller 12 having a corrugated or irregular surface shaped to form spaced portions 13 extending longitudinally thereof. A similar roller or pulley 14 having spaced ribs 15 extending longitudinally thereof is also provided for the other end of the flexible conveyer 11. The rollers 12 and 14 are thus constructed in order to prevent the belt or conveyer 11 from slipping with respect to the rollers when pressure is exerted upon the conveyer. The roller 14 is mounted in suitable bearings 16 and the roller 13 is journaled in suitable bearings 17, the latter having connected therewith adjusting devices 18 in the form of screws which pass through suitable bearings 19 and operate as a means whereby the conveyer 11 may be tightened or loosened by adjusting the handles 20 on the screws 18.

This conveyer 11 may be of any desired length and width and constructed of any suitable material. Motion is imparted to the conveyer in any suitable manner such as by means of a drive shaft 21 which is operated from any suitable source of power and the motion of the shaft 21 is conveyed through the medium of the beveled gears 22—23, the latter being connected with the shaft 24 of the roller 14 to rotate the latter.

Supported above the conveyer 11 is an element 25 preferably provided in its periphery with concaved portions 26 and which latter coöperate to form spaced ribs or active portions 27 extending longitudinally of the element 25 and spaced circumferentially from each other. These ribs or active portions are blunt and the lateral faces thereof diverge inwardly from the periphery of the element so that the edges will gradually separate the material in the casing without damage or injury to the casing. This element 25 is provided with an axle 28 which is journaled in suitable bearings 29 and the element 25 may be of any desired diameter but is of such a diameter that the length of the concaved portion 26 between adjacent portions 27 is of the same length that it is desired to form the links of the sausage. The element 25 is mounted so that during its rotation in the direction indicated by the arrow the surfaces 27 will be successively brought into engagement with the filled casing which is being conveyed upon the conveyer 11 and between the conveyer and the element 25. This will cause the portions 27 as they advance to compress the contacting portion of the casing and separate the material within the casing to form an interval or space between the separated parts of the material. As the conveyer 11 advances and the element 25 rotates, the active portion 27 of the element 25 which has just separated the material in the casing will pass out of contact with the casing just as the compressed portion of the casing reaches a point slightly beyond the forward end of the conveyer 11, for a purpose to be set forth, while the next succeeding portion 27 still remains in contact with the casting so as to hold the casing while the forward link is being twisted.

Motion may be imparted to the element 25 in any suitable manner such as by means of a belt 30 which passes over a pulley 31 connected with the shaft 24 of the roller 14 and a coöperating pulley 32 which is connected with the shaft 28 of the element 29.

Arranged in advance of the end of the conveyer 11 and spaced slightly therefrom is a twisting device designated generally by the reference numeral 34. This may be of any desired length and diameter according to the length of the link that it is desired to form and is preferably mounted so as to be slightly inclined downwardly from the entrance to the exit end to assist in feeding the links therethrough. The casing or twisting mechanism 34 is preferably mounted upon roller bearings 35 and is given a rotary motion in any suitable manner such as by means of a belt 36 which passes over a pulley 37 connected with the casing and also over a pulley 38 connected with the shaft 21. Within the casing 34 and at any suitable point intermediate its ends there may be provided inwardly projecting lugs 39, any number of which may be supplied and these lugs are of a suitable length to compensate the varying sizes of the links. The object of these projections is to contact with the link or casing as it is passing through the twisting mechanism 34 so as to impart a rotary or twisting action of the portion of the casing therein with respect to the portion of the casing adjacent the forward end of the conveyer 11 and which is held by the active portion 27 of the element 25. This operation will cause the portion of the casing in the twisting mechanism 34 to be rotated and will thereby twist the compressed portion of the casing which is held adjacent and slightly in advance of the forward end of the conveyer 11. As soon as the casing is thus twisted and the twisting mechanism 34 rotates, the link which has been formed will be conveyed through the casing 34 and will drop out of contact with the projection 39.

As a means for assisting in feeding the link and a portion of the untwisted casing through the twisting mechanism 34, there may be provided a spiral shaped rib or flange 40 within the element 34 and which extends longitudinally of said element.

If desired and in order to hold the casing upon the conveyer 11 and prevent it from being displaced laterally with respect thereto, guide walls 41 may be arranged along the path of travel of the conveyer 11.

Obviously when it is desired to form links of a greater or of a less length, the element 25 may be removed and another element substituted therefor, and it is also obvious that if it is desired to form links of greater diameter in cross section, another casing or twisting element 34 of greater diameter may be employed.

While the preferred form of the invention has been herein shown and described, it is to be understood that various changes may be made in the details of construction and in the combination and arrangement of the several parts within the scope of the claims without departing from the spirit of this invention.

What is claimed as new is:—

1. A machine of the character described embodying means for feeding the filled casing, means for compressing the casing at spaced intervals, and means for twisting the adjacent spaced portions of the casing one with respect to the other to form links, the first recited means embodying a fixed rotatable support for the casing and a traveling element coöperating with the traveling support and having spaced substantially parallel blunt active edges about its periphery, said edges extending in directions lengthwise of and for the entire length of said element, said edges being adapted to be successively brought into close proximity to the said support, said rotatable element also operating to feed the filled casing into and through the said twisting means.

2. A machine of the character described embodying means for feeding the filled casing, means for compressing the casing at spaced intervals, and means for twisting the adjacent spaced portions of the casing one with respect to the other to form links, the first recited means embodying a traveling support for the casing and a fixed rotatable element having spaced substantially parallel blunt active edges about its periphery, said edges extending in directions lengthwise and for the entire length of said element, said edges being adapted to be successively brought into close proximity to the said support.

3. A machine of the character described embodying a fixed rotatable drum-like element having spaced active edges about its periphery for feeding the filled casing, means for compressing the casing at spaced intervals, said edges extending lengthwise and for the entire length of said element, the lateral faces of the said edges diverging inwardly from the periphery of the said element, and means for twisting the adjacent spaced portions of the casing one with respect to the other to form links, the last recited means embodying a rotatable hollow casing into which the separated portions of the casing are successively fed.

4. A machine of the character described embodying means for feeding the filled casing, means for compressing the casing at spaced intervals, and means for twisting the adjacent spaced portions of the casing one with respect to the other to form links, the last recited means embodying a rotatable hollow casing into which the filled casing is fed, the said hollow casing being of a considerably greater diameter than the diameter of the filled casing, and means connected with the rotatable casing and coöperating with the telescoped portion of the filled casing to cause the two to rotate together, the last recited means embodying a lug extending transeversely of the hollow casing and movable into and out of engagement with the filled casing as the hollow casing is rotated.

5. A machine of the character described embodying means for feeding the filled casing, means for compressing the casing at spaced intervals, and means for twisting the adjacent spaced portions of the casing one with respect to the other to form links, the last recited means embodying a rotatable hollow casing into which the filled casing is fed, and means connected with the rotatable casing and coöperating with the filled casing to cause the two casings to rotate together and to impart a feeding movement of one of the casings with respect to the other.

6. A machine of the character described embodying means for feeding the filled casing, means coöperating with the first recited means for separating the filling in the casing into predetermined lengths, and means for twisting the portion of the casing intermediate adjacent separated portions to form links, the last recited means embodying a rotatable hollow casing into which the said separated portions are fed, and an inwardly extending projection within the rotatable casing, said projection and filled casing being movable into and out of engagement with each other when the hollow casing is rotated whereby the two casings will be caused to rotate together.

7. A machine of the character described embodying means for feeding the filled casing, means coöperating with the first recited means for separating the filling in the casing into predetermined lengths, and means for twisting the portion of the casing intermediate adjacent separated portions to form links, the last recited means embodying a rotatable hollow casing into which the said separated portions are fed, and an inwardly extending spirally disposed rib within the rotatable casing for imparting a feeding movement of the filled casing through the rotatable casing during the rotation thereof.

8. A machine of the character described embodying a traveling support for supporting a filled casing, a rotatable element supported above the casing and having a plurality of concaved faces about its periphery to form spaced active edges extending lengthwise of said element, said edges being adapted to be successively brought into close proximity to the said surface to compress the casing therebetween and separate the material in the casing into predetermined lengths, the lateral faces of said edges diverging from the periphery of the element inwardly, a hollow rotatable casing adjacent the said traveling surface to receive the filled casing therefrom, and means for rotating the said hollow casing for twisting the parts of the filled casing intermediate the said separated portions to form links, the said active edges of the rotatable element operating to feed the filled casing into the rotatable element.

In testimony whereof we have signed our names to this specification, on this 7th day of February, A. D. 1920.

GEORGE K. PAPPAZOGLIDIS.
GEORGE PERINES.